Aug. 7, 1956  E. V. BERGSTROM  2,757,895
PLUG VALVE
Filed April 10, 1952  2 Sheets-Sheet 2
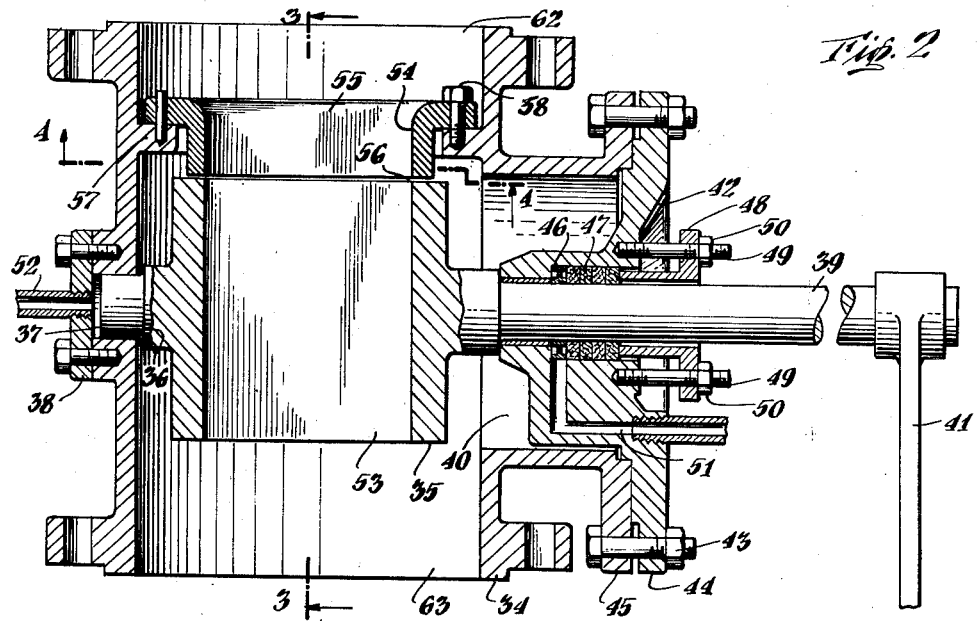
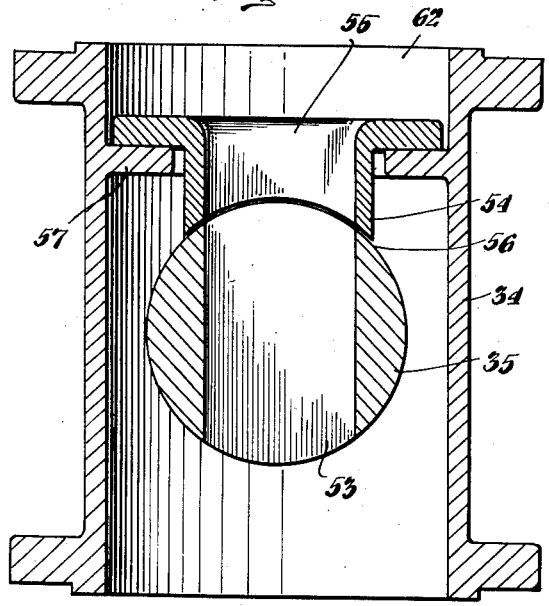
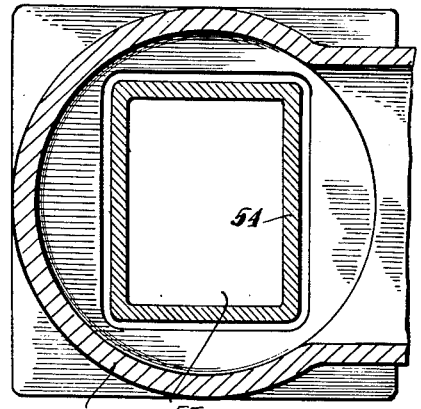
INVENTOR.
Eric V. Bergstrom
BY
Andrew L. Jaboriault
AGENT

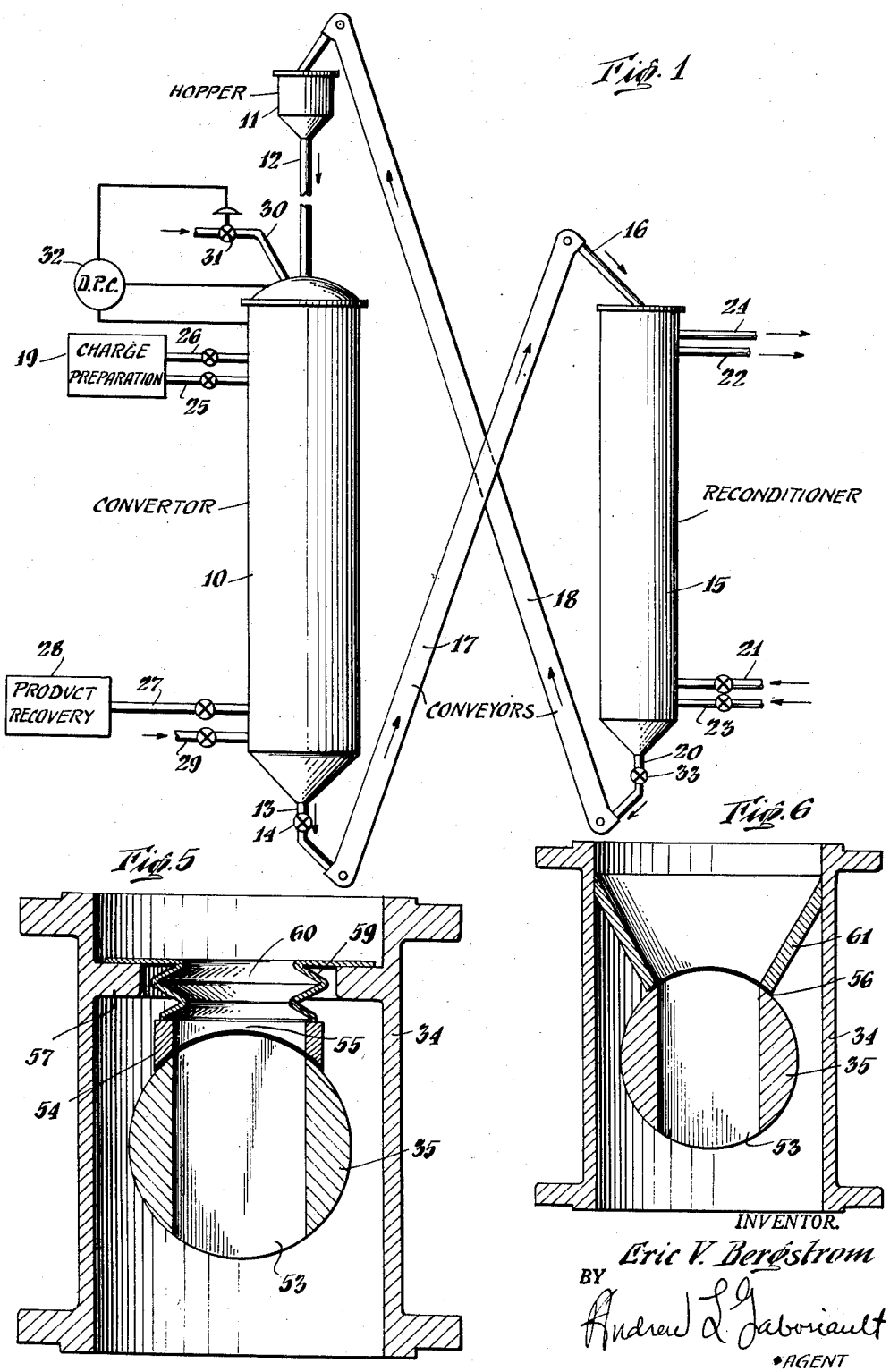

United States Patent Office 2,757,895
Patented Aug. 7, 1956

2,757,895

PLUG VALVE

Eric V. Bergstrom, Short Hills, N. J., assignor to Socony Mobil Oil Company, Inc., a corporation of New York Application April 10, 1952, Serial No. 281,589

5 Claims. (Cl. 251—174)

This invention has to do with an improvement in ordinary plug valves. Specifically, this invention is concerned with plug valves designed to operate at high temperatures, particularly in conduits used for the transfer of high temperature granular contact material. Typical of such applications is the use of plug valves in the lines going to and from catalytic cracking or reforming reactors and regenerators.

Ordinary globe valves or gate valves are not adaptable for use in lines through which granular contact material flows because the obstruction furnished by the contact material within the valve prevents proper seating. Ordinary plug valves, while suitable for use in contact material lines, have the disadvantage that at high temperatures the valves tend to bind and become frozen. This is due mainly to the large area of contact between the plug and the body of the valve. It may be overcome by lubrication of the valve but, because of the high temperatures frequently involved, the valve will not remain lubricated for any considerable length of time without constant attention.

A major object of this invention is to provide a valve which overcomes the difficulties described hereinabove.

A specific object of this invention is to provide a valve suitable for use in high temperature contact material lines.

These and other objects of the invention will become apparent from the following discussion of the invention and the drawings attached hereto.

Broadly, this invention provides for a plug valve in which the plug is rotatably mounted in the valve body and is of less lateral dimensions than the valve body so that a substantial space is provided between the periphery and ends of the plug and the inner surfaces of the body. A drive shaft extends outwardly from one end of the plug to the exterior of the body. An opening extends through the plug at right angles to its axis of rotation. A baffle member extends across the upper section of the body above the plug and closes off the upper portion from the space lying laterally between the plug and body. An opening is provided through the baffle member in a position where it will be aligned with the opening in the plug when the plug is in the open position. The lower edges of the opening are shaped to conform with the contour of the periphery of the plug and are sufficiently close to the plug that when the valve is rotated to the off position, no flow of material through the valve occurs. The invention will be best understood by referring to the attached drawings, of which Figure 1 is an elevational view of a catalytic cracking system employing the improved valve of this invention, Figure 2 is a vertical view, partially in section, of the improved plug valve of this invention, Figure 3 is a sectional view along line 3—3 of Figure 2, Figure 4 is a sectional view along line 4—4 of Figure 2, Figure 5 is a sectional view illustrating a modified form of this invention, and Figure 6 is a sectional view illustrating a second modification of this invention.

All of these figures are diagrammatic in form and like parts in all bear like numerals.

Turning to Figure 1, there is shown a catalytic conversion system of the type in which the improved valve of this invention may be employed. A converter 10 and reconditioner 15 are positioned side by side. Granular catalyst passes into converter 10 from a feed hopper 11 by means of gravity feed leg 12. Catalyst gravities through converter 10 as a substantially compact column. An inert seal gas, such as steam or flue gas, is admitted to the upper end of vessel 10 through conduit 30 and diaphragm valve 31 at a rate controlled by differential pressure controller 32. A hydrocarbon charge is admitted to the upper end of the vessel. This charge may be fractionated in a charge preparation system 19 into a vaporized portion and a liquid portion which may be admitted to converter 10 through conduits 26 and 25, respectively. Suitable means (not shown) may be provided within the converter to distribute the hydrocarbon charge uniformly over the horizontal cross-section of the catalyst column therein. Hydrocarbon charge passes downwardly through the catalyst column and is converted to lower boiling hydrocarbons which may contain high percentages of gasoline and fuel oil. These products may be removed from the converter through conduit 27 and delivered to product recovery system 28. The used catalyst, on which are deposited carbonaceous contaminants, is purged free of hydrocarbon products by means of inert purge gas such as steam or flue gas which is admitted to the converter through conduit 29. Used catalyst is removed from the converter through conduit 13 and valve 14 and transferred to the top of regenerator 15 by means of conveyor 17 and conduit 16 on its upper end. Catalyst passes downwardly through regenerator 15 as a substantially compact column. An oxygen containing gas, such as air, is admitted to the lower section of the reconditioner through conduit 21 and passes upwardly through the catalyst column therein to burn off the carbonaceous contaminants on the catalyst. Flue gas is removed through conduit 22. Heat transfer tubes (not shown) may be fixed within the reconditioner to prevent overheating of the catalyst to a heat damaging level. These tubes may be supplied with a suitable cooling fluid through conduit 23 and cooling fluid may be removed through conduit 24. The regenerated catalyst is removed from the reconditioner by means of conduit 20 and valve 33 and transferred to hopper 11 by means of conveyor 18. Conveyors 17 and 18 may be of any construction suitable for the transfer of hot contact material, such as bucket elevators. Valves 14 and 33 are those which are preferably constructed according to the teaching of this invention.

Figures 2, 3 and 4 are sectional views of a valve constructed according to this invention and are best considered together. In these figures there is shown a valve body 34 which is square in cross-sectional shape in its central section and circular in cross-sectional shape in its outer sections and has open charge 62 and discharge 63 ends. A cylindrical plug 35 is rotatably mounted centrally within valve body 34 and is of smaller diameter and length than the corresponding dimensions of body 34 so that a substantial space is provided between the ends and periphery of the plug and the inner surfaces of the valve body. A pivot 36 extends centrally downwardly from the bottom of plug 35 and into opening 37 in the bottom of valve body 34. Opening 37 is closed at its outer end by means of flange 38. A drive shaft 39 extends centrally upwardly from the upper end of plug 35 and outwardly to the exterior of valve body 34 through bonnet opening 40. A handle 41 is provided at the outer end of shaft 39 so that plug 35 may be rotated to open and closed positions. A bonnet 42 fits closely about shaft 39 and over bonnet opening 40 in valve body 34. The bonnet is bolted to valve body 34 by means of bolts 43 which pass through flanges 44 and 45 on bonnet and body, respectively. A recess 46 is provided in bonnet 42 adjacent to shaft 39 in which packing 47 may be placed. Packing 47 is compressed by packing nut 48 held in position by bolts 49 with nuts 50. A passageway 51 for seal gas is provided in bonnet 42. A second seal gas passageway 52 is provided through flange 38. An inert seal gas, such as steam or flue gas, is admitted through both 51 and 52 to the space between bonnet opening 40 and shaft 39 to prevent the escape of any gaseous materials from within the valve around the shaft to the exterior of the valve. An opening or passageway 53 extends through plug 35 at right angles to its axis of rotation and is capable of being aligned with the charge and discharge ends of body 34. While passageway 53 is shown as having a rectangular cross-sectional shape, it may be of any other desired shape, such as circular. A baffle or sealing member 54 having a central opening 55 of about the same size and shape as passageway 53 is fixed within the upper section of the valve body adjacent its charge end and in front of plug 35 so as to close off the upper section from communication with the space lying between plug 35 and body 34. Baffle member 54 is bolted to flange 57 on the valve body by means of bolts 58. Member 54 is situated within valve body 34 in such a way that passageway 53 will be aligned with opening 55 when plug 35 is rotated to the open position. The lower edges of opening 55 are shaped to conform with the contour of the periphery of plug 35 and are spaced a distance 56 from said plug. Clearance 56 should be small enough so that contact material granules will not pass between the inner end of the member 54 and the plug, that is, less than the diameter of the contact material particles. With the plug in the open position, baffle member 54 acts to funnel contact material entering the valve body at charge port 62 into passageway 53 in plug 35. With plug 35 in the closed position, member 54 acts as a sealing member and prevents contact material flow through the valve. This valve overcomes the difficulties of prior art valves described hereinabove since contact between the rotating plug and stationary metal surfaces is at a minimum. Thus, little or no lubrication is required and the valve will never bind or become frozen.

It will be noted that the above-described valve provides no seal against gas flow when the valve is in the closed position. While a gas tight seal is generally not necessary in the systems to which this valve is preferably applied, such a seal may be provided as shown in Figure 5 which is a sectional view of a modified form of this invention taken along the same line as Figure 3. In Figure 5 there is shown a metallic bellows 59 which is attached at its outer end to flange 57 on valve body 34. An opening 60 passes centrally through the bellows. This bellows is of such a size and so positioned that it is unded continuous tension and acts to force sealing member 54 against plug 35 and thereby provide a gas tight seal.

A further modification is shown in Figure 6. In that figure the baffle member takes the form of a funnel 61, open on top and bottom. The larger end of 61 is connected to the walls of body 34, while the smaller end extends downwardly adjacent to plug 35. The smaller end is shaped to conform with the contour of the periphery of the plug and is spaced away from the plug a distance less than that which would allow the passage of contact material between member 61 and plug 35.

The various components of the improved valve of this invention may take different forms than those shown in the attached drawings. For example, while the opening in the baffle or sealing member is shown to be the same size and shape as the opening in the plug, broadly these two openings may differ in size and shape so that the opening in the baffle member is substantially larger or smaller than that in the plug. Preferably, however, the two openings are of the same size and shape, as shown. When the valve is of a type where the baffle member is fixed, such as shown in Figures 2, 3 and 4 and 6, the clearance 56 should be less than the diameter of the contact material particles being used. Preferably, this clearance should be within the range about 0.030 to 0.080 inch. This valve is generally applicable to contact material of a size within the range about 3 to 20 mesh. It is preferable that the closing edge of baffle or sealing member and the plug be made of a material hard enough to withstand the erosive action of contact material which normally occurs on closing due to the pinching of contact material particles. Suitable materials for this member include stellite and similar hard facings.

As an example of the construction of a suitable valve according to this invention, a valve for use in a 12 inch standard pipe line through which a granular catalyst was flowing will be considered. The design temperature of the valve was 950° F. and the design pressure 25 pounds per square inch gage. Externally, the valve body was 16½ inches square at its center and 23 inches long. The walls of the valve body were ¾ inch thick. Plug 35 was in the shape of a horizontal circular cylinder having an 11 inch diameter and was 12 inches long. Vertical passageway 53 was in the shape of a rectangle with a 9 inch height and a 6½ inch width. Sealing member 54 had a central opening of the same dimensions and a wall thickness of one inch. The inner end of member 54 was spaced 1/32 of an inch from the plug over its entire area.

This invention should be understood to cover all changes and modifications of the examples of the invention herein chosen for purposes of disclosure which do not constitute departures from the spirit and scope of the invention.

What is claimed is:

1. A plug valve which comprises in combination: a valve body having an open upper inlet end and an open lower discharge end, a plug rotatably mounted on its axis of symmetry within said valve body having a drive shaft on one end thereof, said plug being of lateral dimensions less than the corresponding dimensions of said valve body so that a substantial space is provided between the ends and periphery of said plug and the corresponding inner surfaces of said body and said plug having an opening therethrough at right angles to its axis of rotation whereby a continuous passage through the valve is provided when said opening is aligned with the inlet and discharge ends of said body, a baffle member across the upper inlet portion of said body closing off said upper portion from the space lying laterally between the body and the plug, said baffle member having a central opening therein above the opening in said plug when said opening in said plug is aligned with the inlet and discharge ends of said body, the lower edge of said opening in said baffle member being shaped to conform with the contour of the periphery of said plug and lying sufficiently close to said plug that when said plug is rotated to its closed position no flow of material occurs through said valve and said plug having a circular shape in all planes normal to its axis of rotation at least in those regions which must pass by said baffle member during the opening and closing operation and so mounted that as said plug is rotated to open and close said valve any given point on the surface of said baffle member adjacent said plug remains a substantially unvarying distance from the surface of said plug passing by said baffle member.

2. A plug valve which comprises in combination: a valve body having an open upper inlet end and an open lower discharge end, a plug rotatably mounted on its axis of symmetry within said valve body having a drive shaft on one end thereof, said plug being of less lateral dimensions than the corresponding dimensions of said valve body so that a substantial space is provided between the ends and periphery of said plug and the adjacent inner surfaces of said valve body and said plug having an opening extending therethrough at right angles to its axis of rotation whereby a continuous passage through the valve is provided when the opening is aligned with the charge and inlet ends of the valve body, a baffle member across the upper inlet portion of said body above said plug closing off said upper portion from the space lying laterally between the body and the plug, said baffle member having a central opening therein above the opening in said plug, the lower edge of said opening in said baffle being shaped to conform with the contour of the periphery of said plug and being spaced a distance above said plug within the range about 0.030 to 0.080 inches, whereby flow through the valve may be controlled by rotating said plug and said plug having a circular shape in all planes normal to its axis of rotation and so mounted that as said plug is rotated to open and close said valve any given point on the surface of said baffle member adjacent said plug remains an unvarying distance from said plug.

3. A plug valve for use with flowing particles of granular contact material which comprises in combination: a valve body having an open upper inlet end and an open lower discharge end, a plug rotatably mounted on its axis of symmetry within said valve body and having a circular cross-sectional shape in a plane at right angles to its axis of rotation and a drive shaft on one end thereof, said plug being of smaller diameter and length than the corresponding dimensions of said valve body so that a substantial space is provided between the ends and periphery of said plug and the adjacent inner surfaces of said valve body and said plug having an opening therethrough at right angles to the axis of rotation of said plug whereby a continuous passage through said valve is provided when said opening is aligned with the inlet and discharge ends of said valve body, a baffle member across the section of said body adjacent the inlet end and in front of said plug closing off said section from the space lying laterally between said body and said plug, said baffle member having a central opening therein above the opening in said plug, the lower edge of said opening in said baffle member being shaped to conform with the contour of the periphery of said plug and being spaced a distance less than the diameter of said contact material particles from said plug, whereby flow of contact material through said valve may be controlled by rotating said plug and as said plug is rotated any given point on the surface of said baffle member adjacent to said plug remains an unvarying distance from said plug.

4. A plug valve which comprises in combination: a valve body having an open upper charge and an open lower discharge end, a plug rotatably mounted in said body and having a drive shaft on one end thereof extending to the exterior of said body, said plug being of circular cross-sectional shape normal to its axis of rotation and of smaller diameter and length than the corresponding dimensions of said body so that a substantial distance is provided between the ends and periphery of said plug and the adjacent inner surfaces of said valve body and said plug having an opening therethrough at right angles to its axis of rotation whereby a continuous passage through said valve is provided when said opening is aligned with the charge and discharge ends of said body, a sealing member above said plug having a central opening therethrough above the opening in said plug when the opening in said plug is aligned with the charge and discharge ends of said body, the lower edge of said opening in said sealing member being shaped to conform with the contour of the periphery of said plug, a bellows attached to said body on its outer end and to said sealing member on its inner end so as to force said sealing member against said plug at all times during the opening and closing operation whereby flow through said valve may be controlled by rotating said plug.

5. A plug valve which comprises in combination: a valve body having an open upper inlet end and an open lower discharge end, a plug of circular cross-sectional shape rotatably mounted on its axis of symmetry in said body and having a drive shaft on one end thereof extending to the exterior of said body, said plug being of smaller diameter and length than the corresponding dimensions of said body so that a substantial distance is provided between the ends and periphery of said plug and the adjacent inner surfaces of said valve body and said plug having an opening therethrough at right angles to its axis of rotation whereby a continuous passage through said valve is provided when said opening is aligned with the inlet and discharge ends of said body, a funnel shaped baffle member opened at the top and bottom with the larger end thereof connected to the walls of the inlet end of said body and extending down so that the smaller end is adjacent to said plug, the smaller end of said member being shaped to conform with the contour of the periphery of said plug and being spaced a distance within the range about 0.030 to 0.080 inch therefrom and said plug having a circular shape in all planes normal to its axis of rotation and so mounted that as said plug is rotated to open and close said valve any given point on the surface of said baffle member adjacent said plug remains an unvarying distance from said plug.

References Cited in the file of this patent

UNITED STATES PATENTS

| | | |
|---|---|---|
| 117,704 | Warren | Aug. 1, 1871 |
| 982,446 | Smith | Jan. 24, 1911 |
| 1,989,009 | Heggem | Jan. 22, 1935 |
| 2,032,623 | Lewis | Mar. 3, 1936 |
| 2,144,619 | Corley | Jan. 24, 1939 |
| 2,471,941 | Downey | May 31, 1949 |
| 2,574,428 | Wheatley | Nov. 6, 1951 |
| 2,577,725 | Drake | Dec. 11, 1951 |

FOREIGN PATENTS

| | | |
|---|---|---|
| 350,836 | Germany | Mar. 27, 1922 |